Aug. 12, 1952     J. FLEISCHER     2,606,464
GUN TYPE DRILL
Filed May 2, 1949     2 SHEETS—SHEET 1
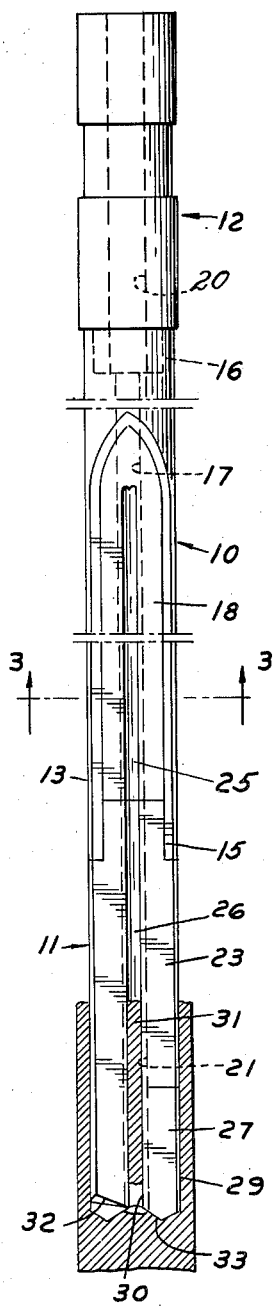
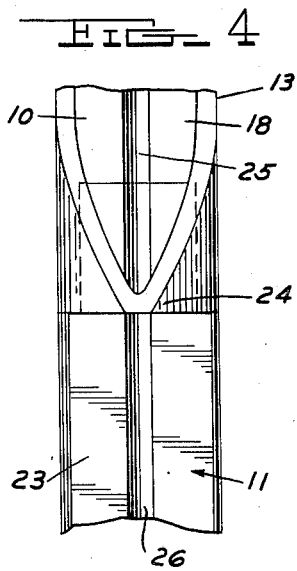
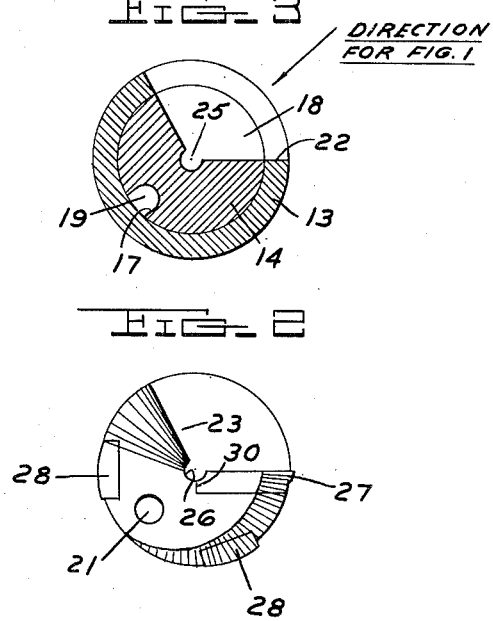
INVENTOR.
JOHN FLEISCHER

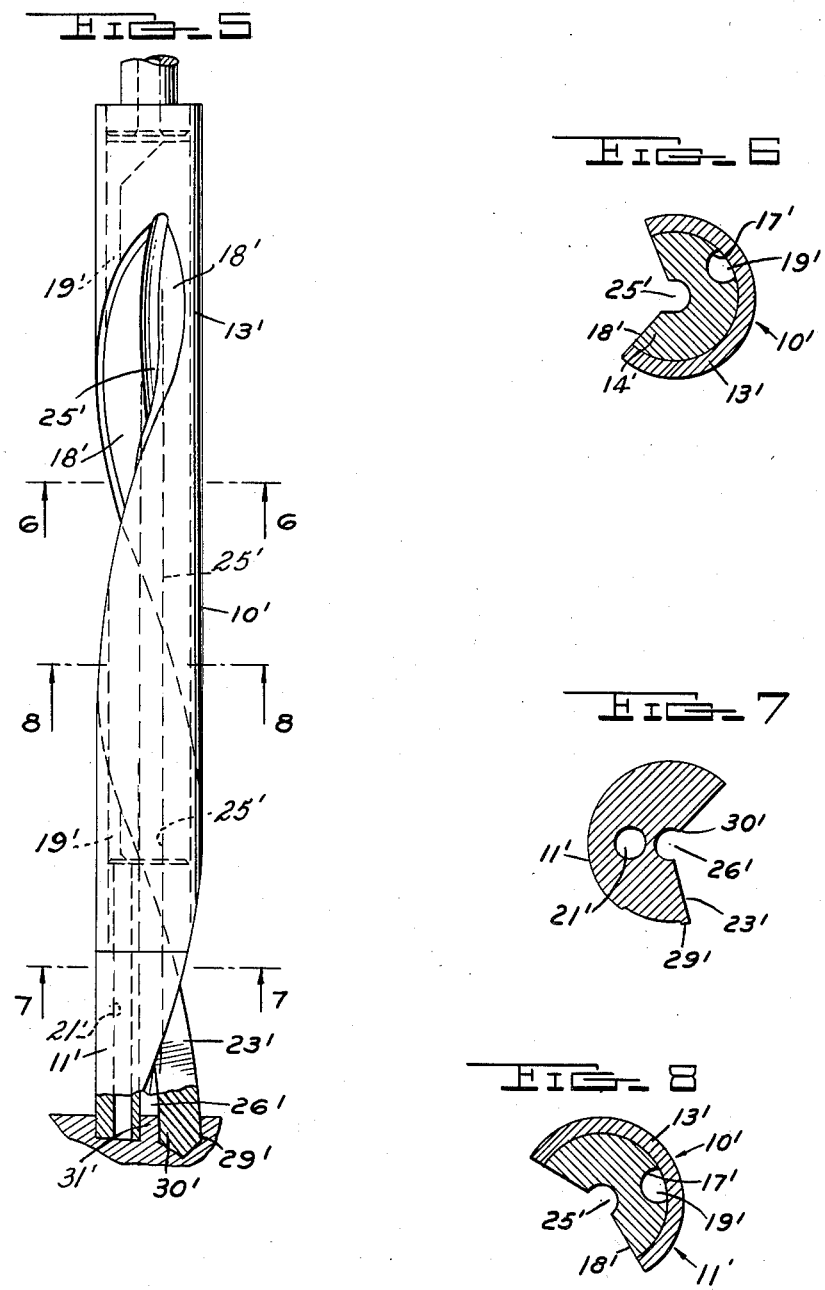

Patented Aug. 12, 1952

2,606,464

UNITED STATES PATENT OFFICE 2,606,464

GUN TYPE DRILL

John Fleischer, Van Dyke, Mich., assignor to National Twist Drill & Tool Company, Rochester, Mich., a corporation of Michigan Application May 2, 1949, Serial No. 90,935

7 Claims. (Cl. 77—68)

This invention relates generally to drills and refers more particularly to improvements in drills of the general type shown in my Patent No. 2,418,021 dated March 25, 1947.

The above patent shows a gun type drill having a relatively long shank and having a drill bit secured to one end of the shank. The shank and drill bit, in addition to having registering flutes for receiving chips, also have registering bores forming a passage for a lubricant and/or coolant. The registering bores are offset from the axis of the drill assembly, and a generally circular opening extends along the axis of the drill assembly at the base of the chip flutes. The opening at the outer end of the drill bit is intersected by the primary cutting edge of the bit in a manner such that as the work is being drilled by the bit, a rod is formed on the work. This rod extends along the axial opening and acts as a guide to prevent "run-out" of the drill bit.

Drill assemblies of the above general type are highly satisfactory when drilling relatively long holes, but are costly to produce, and it is one of the objects of this invention to greatly reduce the cost of manufacture of such drill assemblies while retaining all of the advantageous features thereof.

It is another object of this invention to provide a drill assembly of the gun type having a shank comprising a tube and a rod secured within the tube. The rod is brazed, welded or otherwise permanently secured to the tube and cooperates with the latter to form a strong, rigid shank.

The invention has as another object to provide a shank of the above type wherein the tube has a longitudinally extending slot at one side registering with a groove in the adjacent side of the rod to provide a chip flute, and wherein the base of the groove has a generally circular opening arranged on the shank axis for the purpose noted above.

Another object of this invention is to provide a shank of the type noted in the preceding paragraph wherein the rod has a longitudinally extending groove in the side opposite the flute forming a coolant and/or lubricant passage with the adjacent side of the tube. This feature avoids the tedious and costly operation of drilling the long shank to provide the required coolant passage.

It is a further object of this invention to provide a gun-type drill assembly wherein the chip grooves in the shank and drill bit extend at a predetermined helix angle with respect to the axis of the drill assembly. This arrangement is especially advantageous in instances where the work is held stationary and the drill assembly is rotated relative to the work during the forming operation.

The foregoing as well as other objects will be made more apparent as this description proceeds, especially when considered in connection with the accompanying drawing, wherein:

Figure 1 is a fragmentary side elevational view of a drill assembly constructed in accordance with this invention;

Figure 2 is an end elevational view of the drill assembly;

Figure 3 is a cross sectional view taken on the line 3—3 of Figure 1;

Figure 4 is a fragmentary side elevational view showing the connections between the shank and drill bit;

Figure 5 is a view similar to Figure 1 showing a modified form of drill assembly;

Figure 6 is a cross sectional view taken on the line 6—6 of Figure 5;

Figure 7 is a cross sectional view taken on the line 7—7 of Figure 5; and

Figure 8 is a cross sectional view taken on the line 8—8 of Figure 5.

The drill assembly selected for the purpose of illustration comprises a shank 10, a drill bit or tip 11 at one end of the shank and a holder 12 at the opposite end of the shank. The shank 10 embodies a tube 13 of substantial length and a rod 14 telescoped within the tube. The rod 14 is somewhat shorter than the tube 13 and the opposite ends of the tube project beyond the adjacent ends of the rod. The drill bit 11 is formed with a reduced portion 15 at one end of a size to fit in one end of the tube 13 and is welded, brazed or otherwise permanently secured to the tube. The holder 12 is also formed with a reduced portion 16 at one end of a size to fit within the opposite end of the tube and is preferably welded, brazed or otherwise permanently secured to the tube. The purpose of the holder is to enable securing the drill assembly in a drill press or suitable drilling machine.

The rod 14 is milled or otherwise formed with a groove 17 in one side and with a flute 18 in the opposite side. The groove 17 extends from one end of the rod to the other and cooperates with the adjacent wall of the tube to form a passage 19 for a suitable coolant. The holder 12 has an axially extending bore 20 forming the receiving end of the passage 19 and the drill bit 11 has a bore 21 forming the discharge end of the passage 19. The bore 21 extends from one end of the drill bit to the other, and is offset with respect to the axis of the bit 11 to assume a position substantially in alignment with the groove 17.

The rod 14 is brazed, welded or otherwise permanently secured to the tube 13, and the latter is slotted as at 22 in registration with the flute 18 to provide a chip receiving channel. The drill bit 11 is milled or otherwise formed with a flute 23 corresponding to the flute 18, and extending from one end of the bit to the other. The flute 23 registers with the flute 18 and forms a continuation of the chip channel to enable relatively free passage of chips upwardly from the cutting tip of the bit. In manufacture the slot 22 is initially terminated short of the bit to provide a ring 24 shown in Figure 4 of the drawing. This ring 24 assists in locating the bit 11 during brazing of the reduced portion 15 of the bit to the adjacent end of the tube 13, and is subsequently slotted to open the chip channel.

It will be noted that the side walls of the flute 18 terminate in a generally circular opening or groove 25 in the rod and that the side walls of the flute 23 terminate in similar circular groove 26 forming a continuation of the groove 25. It will also be noted particularly from Figure 2 of the drawing that the drill bit 11 is provided with a tungsten carbide or other hardened cutting insert 27, and is further provided with two tungsten carbide inserts 28 along its circumference to promote the cutting of the bore in the work being drilled. The insert 27 extends along one side of the flute 23, and the outer cutting edge 29 serves to cut and/or ream the inner surface of the work being drilled. The inner cutting edge 30 intersects one side of the groove 26 in the manner shown in Figure 2, and forms a central rod or wire 31 on the work being drilled. As the drilling operation proceeds, the rod 31 extends upwardly along the groove 26 from the bottom of the bore being formed, and serves to support or guide the drill assembly. As a result "run-out" of the drill assembly is reduced to a minimum regardless of the length of the bore or hole being drilled. This rod is subsequently removed in any suitable manner, such for example, as by drilling.

Upon reference to Figure 1 of the drawing, it will be noted that the lower end of the insert 27 is generally V-shaped, and forms the primary cutting surface of the drill bit. The tip of the drill bit on the opposite side of the axis from the insert 27 is ground to a slant 32 substantially coinciding with the slant or rake of the adjacent side 33 of the insert. The particular construction of the drill bit forms no part of this invention, and need not be described in detail. It will suffice to point out that the drill bit effectively cuts the work, and is designed to reduce breakage resulting from non-uniform heating of the drill bit to a minimum.

The drill bit is effectively cooled by flowing a coolant such as a lubricant through the passage 19. The coolant is discharged from the passage into the bore being drilled in the work around the cutting edges of the bit and serves to lubricate as well as cool the latter. The lubricant and/or coolant flows back or out along the flute 23 into the flute 18 and assists in conveying the chips out of the bore being drilled.

Referring to the embodiment of the invention shown in Figures 5 to 7 inclusive, it will be noted that the chip receiving flute 18' in the shank 10' and the registering flute 23' in the bit 11' extend helically with respect to the axis of the drill. As in the first described form of the invention, the base portions of the flutes 18' and 23' have openings 25' and 26', respectively. These openings are aligned with one another and extend along the axis of the drill.

The outer edge 29' of the spiral flute 23' serves to cut and/or ream the inner surface of the work being drilled, and the inner helical edge 30' of the flute 23' is fashioned to form a cutting edge. The cutting edge 30' intersects one side of the axially extending opening 26' and serves to form a rod or wire 31' during the drilling operation similar to the rod 31 shown in Figure 1 of the drawings. The rod or wire 31' serves the same purpose as the rod 31 previously described and is subsequently removed by a drilling operation. It will of course be understood that hardened inserts similar to those indicated by the numerals 27 and 28 in Figure 2 of the drawings may be incorporated in the drill bit 11' if desired.

The rod 14' of the shank 10' is fashioned with a groove 17' in the side thereof opposite the flute 18', and this groove extends helically with respect to the shank axis in substantially parallel relation to the flute 18'. The groove 17' cooperates with the adjacent inner surface of the tube 13' to form a helically extending passage 19' for a suitable coolant and/or lubricant. The drill bit 11' has a straight bore 21' formed therein to one side of the flute 23' in a position determined so that the inner end of the bore registers with the outer end of the passage 19' and the outer end of the bore opens through the bottom face of the bit 11' adjacent the chip groove or flute 23'. Thus the lubricant and/or coolant is conducted from the passage 19' in the shank 10' through the bore 21' in the drill bit 11' to the work being drilled.

The formation of the shanks of both the above drill assemblies by permanently securing a rod within a tube in the manner described not only substantially increases the rigidity and strength of the shanks but, in addition, simplifies and materially reduces the cost of the drill assemblies. Moreover, both drill assemblies render it possible to form smooth bores of substantial length with a minimum amount of "run-out" and chattering. Furthermore, provision is made in both assemblies to maintain the temperature of the drill bits well within practical limits during the drilling operation, and breakage due to overheating is accordingly reduced to a minimum.

What I claim as my invention is:

1. A drill having an elongated shank comprising a tube, a rod telescoped within the tube and extending for the major portion of the length of the tube to reinforce the latter, a chip flute in the form of a groove in the outer surface of the rod and extending lengthwise of the rod, a central groove in the rod opening into the base of the flute and having the walls concentric with the axis of the rod, a slot through one side of the tube extending lengthwise of the tube and registering with the chip flute in the rod, a drill bit having one end sleeved into one end of the tube and secure to the latter, said drill bit having a chip flute in the form of a groove in one side positioned to register with the chip flute in the rod and having a central groove at the base of the chip flute aligned with the central groove in the rod, and a cutting edge at the outer end of the drill bit extending generally radially outwardly from the central groove in the drill bit.

2. The drill defined in claim 1 wherein one end of the tube projects beyond the corresponding end of the rod and wherein the adjacent end of the drill bit is reduced in diameter and is sleeved into the projecting end of the tube in abutting engagement with the adjacent end of the rod to form in effect a continuation of the latter.

3. The drill defined in claim 1 comprising a holder having a reduced portion sleeved into the end of the tube opposite the drill bit and secured to said tube.

4. The drill defined in claim 1 wherein the chip flutes and central grooves in the rod and drill bit as well as the slot in the tube extend helically with respect to the axis of the drill.

5. The drill defined in claim 1 having a recess extending lengthwise of the rod in circumferential spaced relation to the chip flute and coacting with the tube to provide a passage for coolant.

6. The drill defined in claim 5 wherein the drill bit has a bore offset from the axis thereof and aligned with the recess to form a continuation of the coolant passage.

7. A drill having an elongated shank comprising a tube, a rod extending for the major portion of the length of the tube and telescoped within said tube, said rod having the outer surface engageable with the inner surface of the tube and being secured to said tube to reinforce the tube for a substantial part of its length, a chip flute extending lengthwise of the rod at one side thereof and a slot extending lengthwise of the tube in registration with the chip flute, a recess extending lengthwise of the rod in circumferential spaced relation to the chip flute and cooperating with the tube to provide a coolant passage, and a drill bit sleeved into one end of the tube and secured to said tube, said drill bit having a chip flute registering with the chip flute in the rod and having a bore aligned with the coolant passage.

JOHN FLEISCHER.

REFERENCES CITED

The following references are of record in the file of this patent:

UNITED STATES PATENTS

| Number | Name | Date |
|---|---|---|
| 534,009 | Pratt | Feb. 12, 1895 |
| 2,346,546 | Anderson | Apr. 11, 1944 |
| 2,405,298 | Fleischer | Aug. 6, 1946 |
| 2,418,021 | Fleischer | Mar. 25, 1947 |

FOREIGN PATENTS

| Number | Country | Date |
|---|---|---|
| 315,006 | Germany | Oct. 20, 1919 |